United States Patent [19]
Benoit et al.

[11] Patent Number: 5,937,496
[45] Date of Patent: Aug. 17, 1999

[54] ELECTROMAGNETIC JOINT FORMING METHOD FOR MOBILE UNIT FRAMES

[75] Inventors: Robert L. Benoit, Oakdale; Glenn L. Spacht, Lloyd Neck, both of N.Y.

[73] Assignee: NBG Technologies, Inc., Hauppauge, N.Y.

[21] Appl. No.: 08/680,532

[22] Filed: Jul. 9, 1996

[51] Int. Cl.⁶ .................................................. B23P 17/00
[52] U.S. Cl. .................... 29/419.2; 29/516; 280/281.1
[58] Field of Search ................... 29/419.2, 516; 280/281.1

[56] References Cited

U.S. PATENT DOCUMENTS

| | | |
|---|---|---|
| 587,695 | 8/1897 | Billing et al. .............................. 29/516 |
| 1,169,942 | 2/1916 | Egly . |
| 1,291,388 | 1/1919 | Bright et al. . |
| 1,329,479 | 2/1920 | Savon . |
| 1,548,990 | 8/1925 | Garman . |
| 1,703,037 | 2/1929 | Heck . |
| 2,174,010 | 9/1939 | Patterson . |
| 2,429,293 | 10/1947 | Peck et al. . |
| 2,969,996 | 1/1961 | White, Jr. . |
| 3,239,930 | 3/1966 | Violleau . |
| 3,293,884 | 12/1966 | Grob . |
| 3,432,192 | 3/1969 | Ito et al. .................................... 29/516 |
| 3,432,916 | 3/1969 | Fisher et al. . |
| 3,642,311 | 2/1972 | Edgemond, Jr. . |
| 3,652,111 | 3/1972 | Dent . |
| 3,689,112 | 9/1972 | Slator et al. ............................... 29/516 |
| 3,735,473 | 5/1973 | Wilson .................................... 29/419.2 |
| 3,792,603 | 2/1974 | Orain . |
| 3,837,755 | 9/1974 | Benoit et al. . |
| 3,966,230 | 6/1976 | Nicol . |
| 4,125,000 | 11/1978 | Grob . |
| 4,154,082 | 5/1979 | Beech . |
| 4,479,662 | 10/1984 | Defour et al. ........................ 280/281.1 |
| 4,523,872 | 6/1985 | Arena et al. . |
| 4,583,755 | 4/1986 | Diekman et al. ..................... 280/281.1 |
| 4,648,616 | 3/1987 | Diekman et al. ..................... 280/281.1 |
| 4,705,286 | 11/1987 | Lauzier et al. ....................... 280/281.1 |
| 4,900,049 | 2/1990 | Tseng . |
| 4,902,160 | 2/1990 | Jeng .................................... 280/281.1 |
| 4,924,584 | 5/1990 | Harney . |
| 5,100,162 | 3/1992 | Lo ....................................... 280/281.1 |
| 5,188,177 | 2/1993 | Cury . |
| 5,304,012 | 4/1994 | Wendling . |
| 5,372,332 | 12/1994 | Spacht et al. . |
| 5,404,630 | 4/1995 | Wu . |
| 5,492,122 | 2/1996 | Button et al. . |
| 5,522,280 | 6/1996 | Bexten . |

FOREIGN PATENT DOCUMENTS 1269986  6/1968  Germany .................................. 29/516

*Primary Examiner*—David P. Bryant
*Attorney, Agent, or Firm*—Darby & Darby

[57] ABSTRACT

A method and apparatus for coupling tubular elements of a frame without welding or adhesive bonding. Connection elements are used with which mechanical connections may be accomplished by deforming the tubular element to conform to the shape of its respective connection element. Preferably, the connection element is shaped to be inserted within a hollow end of a tubular element and includes radially inwardly directed recesses. The tubular element is deformed with respect to the recesses, preferably by electromagnetic pulse forming, to thereby lock the tubular element and connection element against relative movement. Such connection elements and method may be used in frames of mobile units such as bicycles, wheelchairs, and walkers. The forming process used in connecting the tubular frame elements may also be used to create ride compliance features in the frame by deforming at least one of the tubular elements to modify its spring constant. The ride compliance features preferably are radially inwardly or outwardly circumferential deformations.

15 Claims, 12 Drawing Sheets

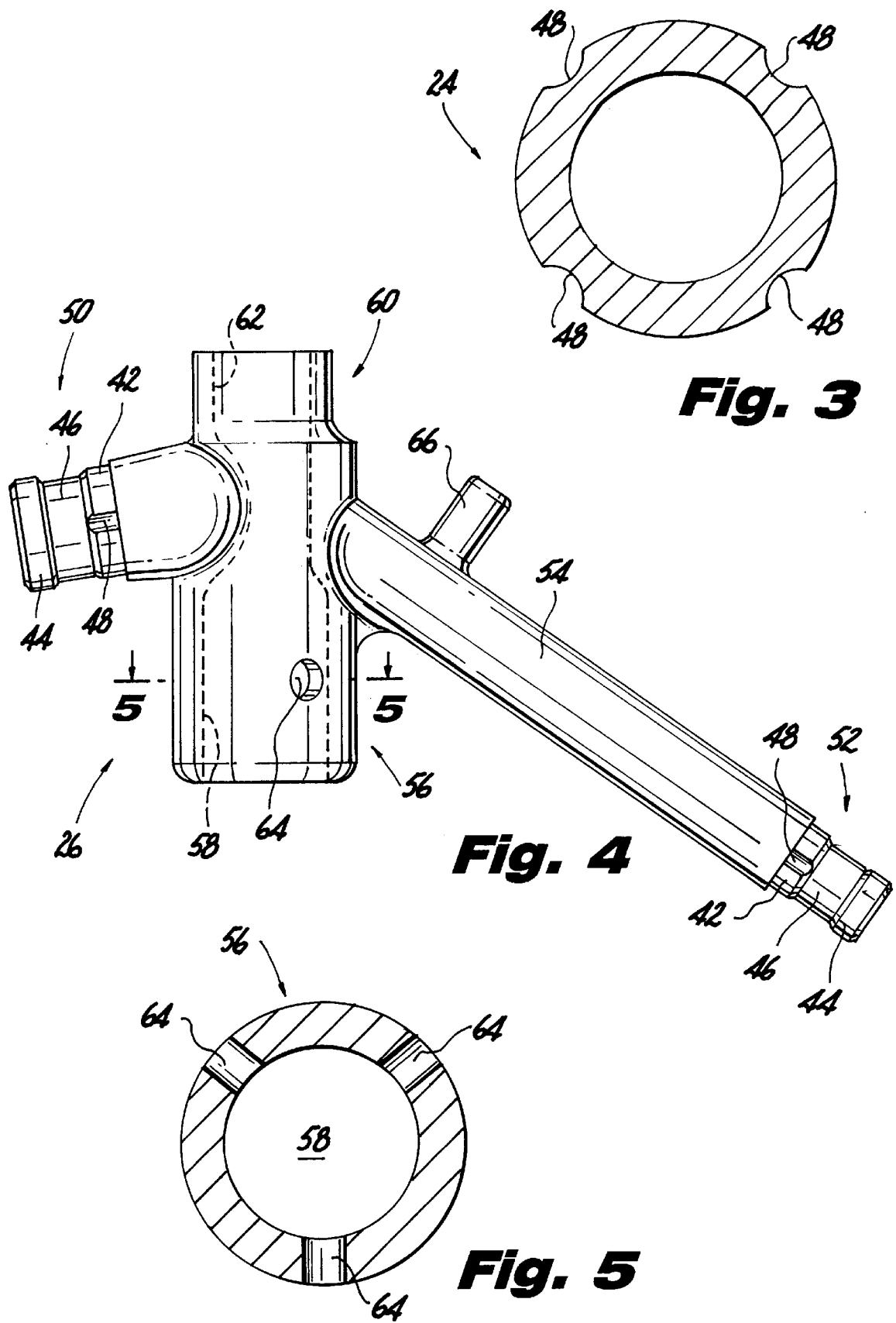

ELECTROMAGNETIC JOINT FORMING METHOD FOR MOBILE UNIT FRAMES

BACKGROUND OF THE INVENTION

The present invention relates to an improved tubular frame for a mobile unit, and the use of improved connection members or elements for joining tubular elements of a frame. The present invention further relates to a method of deforming tubular frame elements to create improved joints in the frame and features that provide improved comfort during riding on the frame. More particularly, the present invention relates to the deforming of tubular frame elements, preferably through the use of electromagnetic pulse forming, to shape the elements into a structural mechanical joint. The joint and joint forming process permits connection of the tubular elements to each other without welding and preferably via a lug formed from a different material. The deformation process of the present invention, such as by electromagnetic pulse forming, may also be used to create ride compliance features that modify the stiffness of the tubular frame to increase rider comfort.

Mobile units, such as bicycles, wheelchairs, and walkers, are typically formed from tubular elements (e.g. having circular, elliptical, and tear drop cross-sections) connected to form a frame for the unit. The tubular elements may be formed of any desired material that provides the required strength to support the user or rider of the unit or device. Such materials include iron, steel, titanium, titanium alloys, aluminum, aluminum alloys, and various composite materials such as graphite epoxy plastic or other carbon fiber-based or composite materials.

Frames formed from aluminum tubing generally have welded connections between the individual tubes. However, welding anneals the material, and thus may weaken the material. For example, welding of aluminum alloy tubes often damages the structural strength of the frame. In order to strengthen the heat affected area at a welded joint, the thickness of the tubular element is generally increased in the area of the weld. The increase in material thickness adds to the weight of the frame. For these reasons, welding is not a desired method for connecting tubes formed of materials that are generally weaker than steel.

There is a growing trend toward use of lightweight materials for the tubular frame elements of mobile units such as bicycles. Often lightweight tubular elements are connected together to form a frame through the use of lugs. The materials of both the tubular elements and the lugs that are used to connect the tubular elements are preferably selected to be as lightweight, yet sturdy, as possible. Thus, it would be desirable to use different materials for the tubes and the lugs to thereby provide the strongest and lightest tubes and lugs possible. For example, composite or plastic lugs may be used to connect aluminum tubes. However, dissimilar materials cannot be welded. They must therefore be joined by bonding. However, conventional bonding does not always result in the strongest of joints between these different materials. Therefore, mobile units typically have tubular elements and lugs that are formed from the same, or similar materials.

Options for bonding tubular elements of a frame to lugs of different materials include screw joints, adhesives, and lug joints. With screw joints, the tubes are screwed into internally threaded lugs. Because one frame tube connector may receive more than one tube, it may be difficult to connect a plurality of frame tubes to a plurality of frame tube connectors by screw joints. Further, sufficient material thickness must exist to tap and thread adjoining tubes, resulting in increased weight. Also a threaded joint is weak in fatigue strength.

The use of adhesives to connect frame tubes is common. However, the process of applying and curing the bonding agent may be rather time consuming. Moreover, the quality of such joints is not easily inspectable, nor consistently good, and the adhesive or bonding agent that is used may weaken over time.

Lug joints are another method of bonding frame tubes and include forming an inside step on the inside surface of a hollow joint of a lug, and an outside, mating step on the outside surface of the frame tube. The frame tube is then inserted into the joint of the lug and the steps engage with each other. Because precision is crucial for this connection method, this method may be particularly expensive and not always reliable if not precisely achieved.

Yet another method of connecting frame tubes with lug joints involves the provision of through holes within a lug, and the deforming of the frame tube within the lug so it is outwardly projected into the through holes of the lug joint. This method, as disclosed in U.S. Pat. No. 5,404,630 to Wu, involves inserting an elastomer element into the frame tube and squeezing the elastomer element from its opposite ends to deform the wall of the frame tube into the holes of the lug joint. A reinforcing tube located within the frame tube may also be used with this method. The reinforcing tube is similarly deformed by the elastomer element and is caused to project through the holes of the lug with the frame tube. This process, accordingly, is time consuming and rather complicated.

The application of a high-energy magnetic pulse to deform or reshape a metal object is known in the art. Such plastic deformation of a metal object is known as electromagnetic forming and is described in, for example, U.S. Pat. No. 5,188,177 to Curry, and a number of other U.S. patents referenced therein. However, the Curry patent only discloses the use of such metal shaping to seal the open end of a tube, and not to form secure joints between tubes. The use of electromagnetic forming to joint metal tubes to metal joints is described in, for example, U.S. Pat. No. 3,837,759 to Benoit et al, and U.S. Pat. No. 4,523,872 to Arena et al. However, these patents relate to the joining of metal structural rods of aircrafts to each other and concentrate on forming strong torque joints. Thus, these patents do not teach joining the lightest and strongest tubes to the lightest and strongest lugs in frames of mobile units, such as bicycles, and do not focus on preventing relative axial movement between the joined elements.

It would accordingly be desirable to join the lightest yet sufficiently sturdy tubular elements (typically metal such as aluminum) with the lightest yet sufficiently sturdy lug possible (typically plastic, or a composite material) without encountering the above-described disadvantages.

As discussed above, in order to reduce the weight of the frame of mobile units such as bicycles, lightweight materials are substituted for conventional high strength, heavy materials such as steel. Aluminum tubing is commonly used to form lightweight bicycles. Because of the reduced yield strength of lightweight materials, such as aluminum, relative to high strength materials, such as steel, the diameters of the frame tubing of lightweight materials must be larger in order to achieve the required frame strength. As a result of the larger diameter tubing, lightweight frames have been criticized by their riders as being too stiff and providing too harsh a ride.

SUMMARY OF THE INVENTION

It is therefore an object of the present invention to provide a method and apparatus for joining together tubular elements of a frame for a mobile unit utilizing the lightest materials possible. Thus, it is an object of the present invention to join lightweight tubular elements using lightweight lugs. The tubular elements and lugs typically are formed from different materials to achieve the lightest possible frame of sufficient strength. Accordingly, an object of the present invention includes the provision of an apparatus and method that permit the joining of tubular elements with lugs formed from different materials, and most preferably, the joining of metal tubes with non-metal lugs.

It is a related object of the present invention to provide a frame formed from tubular elements joined by lugs, where the elements and lugs are formed from the lightest materials possible and are joined without welding or bonding. The tubular elements may be formed from a metal such as aluminum, and are joined together with composite or plastic lugs which are sturdy and lightweight yet inexpensive and easy to manufacture. The frame may be supported by wheels or legs to form a mobile unit such as a bicycle, wheelchair, or walker.

It is a further object of the present invention to provide a ride compliance feature for a frame of a mobile unit that permits the stiffness of the frame to be tailored to specific rider tastes. The ride compliance feature adds to the spring constant of the frame, softens the ride, and may be tailored for riders of different weights.

In accordance with the principles of the present invention, a method and apparatus for joining tubular elements is provided that avoids the use of welding, threading, bonding agents, and other methods of joining which potentially weaken the structure, or methods in which the quality of the connection cannot be visually inspected. The joint forming method and apparatus of the present invention structurally deform the elements to be joined, preferably through the use of electromagnetic pulse forming. Accordingly, elements of different materials may be easily joined to each other. For example, an aluminum tubular element of a bicycle frame may be joined to other tubular elements via composite or plastic lugs using the joint forming method and apparatus of the present invention. Other mobile units, such as wheelchairs, walkers, etc., may also utilize the joint forming method and apparatus of the present invention. Such joint forming is particularly beneficial when used to join lightweight materials to each other.

The lightweight frames formed in accordance with the principles of the present invention often utilize tubular elements that have diameters larger than those of standard steel tubular elements. Accordingly, the ride may be stiffer than in prior art units. In accordance with the principles of the present invention, the ride is softened by providing ride compliance features comprising deformations along the tubes. Such deformations may include circumferential or partially circumferential tube convolutions or grooves formed in one or several of the aluminum tubes comprising the frame of the mobile unit. These convolutions may be formed in a variety of ways, the preferred method using electromagnetic pulse forming. The convolutions may either be formed radially inward (optionally using a mandrel or die placed inside the tubular element), or radially outward (by expanding the tube into an optional female die).

BRIEF DESCRIPTIONS OF THE DRAWINGS

These and other features and advantages of the present invention will be readily apparent from the following detailed description of the invention, the scope of the invention being set out in the appended claims. The detailed description will be better understood in conjunction with the accompanying drawings, wherein like reference characters represent like elements, as follows:

FIG. 3 is a cross-sectional view along line 3—3 of FIG. 2;

FIG. 4 is a side elevational view of a seat tube lug of a bicycle formed in accordance with the principles of the present invention;

FIG. 5 is a cross-sectional view along line 5—5 of FIG. 4;

DETAILED DESCRIPTION OF THE INVENTION

Figure 1:
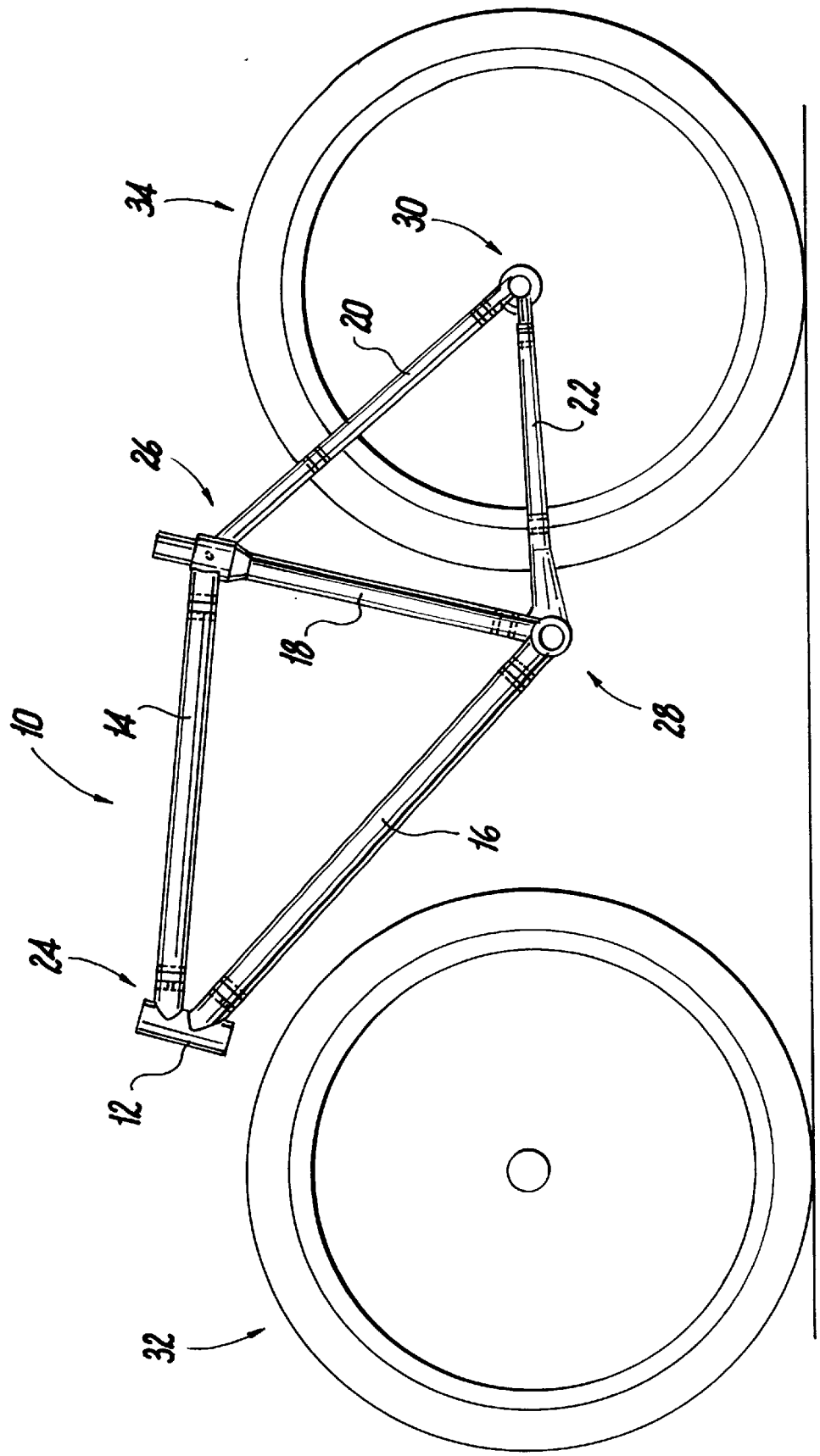
FIG. 1 is a side elevational view of a bicycle having a frame formed in accordance with the principles of the present invention.

A bicycle having a frame 10, formed in accordance with the principles of the present invention, is shown in FIG. 1. Frame 10 includes head tube 12, top tube 14, down tube 16, seat tube 18, seat stays 20 (one on each side of rear wheel 34), and chain stays 22 (one on each side of rear wheel 34). At least top tube 14, down tube 16, seat tube 18, seat stays 20, and chain stays 22 are formed of a deformable material and preferably from an electrically conductive material, such as aluminum or another lightweight yet sturdy metal. Head tube 12 is preferably formed integrally with head tube lug 24 to which top tube 14 and down tube 16 are joined. Top tube 14, seat tube 18, and seat stays 20 are coupled via seat tube lug 26. Down tube 16, seat tube 18, and chain stays 22 are coupled via crank lug 28. Seat stays 20 and chair stays 22 are coupled via dropout assembly 30. As in prior bicycles, head lug 24 is coupled to front wheel 32 via the handle bar stem and front fork (see FIG. 15) and dropout assembly 30 is coupled to rear wheel 34.

Because at least tubes 14, 16, 18, 20, and 22 are formed from a sturdy yet lightweight, and preferably electrically conductive, e.g., metallic, material, such as aluminum, the frame is generally lighter than a plastic frame of equal strength (because plastic frames are not as strong as metal frames, plastic tubular elements must be thicker than metal elements, and therefore the resulting frame is heavier). Bicycle frames of the prior art having metallic tubular elements typically also have metallic lugs and dropouts to which the tubular elements are welded. Since welding typically weakens the material at the heat affected zone because welding anneals the metal, prior art tubular elements must be thicker at the weld joint, thereby increasing the weight of the frame. In accordance with the principles of the present invention, at least head lug 24, seat tube lug 26, and crank lug 28 are formed from a sufficiently sturdy material, such as an injection moldable plastic, which is lighter than the material of prior art lugs. The selected material for lugs 24, 26, and 28 preferably is also easy to form into a lug and low in cost. Dropout assembly 30 may either be formed of a lightweight material such as that used to form the lugs, or may be a standard dropout assembly on which adaptors, discussed in further detail below, are placed to allow for stronger joint connections than in the prior art. The connection joints of lugs 24, 26, and 28, and the tangs (or adaptors mounted on the tangs) of dropout assembly 30 are shaped such that tubular elements 14, 16, 18, 20, and 22 may be deformed around the joints and tangs (or adaptors), without welding, adhesive bonding, or joining with a third mechanical element to conform to the interengaging shape of the lug joint. Accordingly, the joints of lugs 24, 26, and 28 (i.e., the areas at which respective tubular elements are connected) and the tangs of dropout assembly 30 (i.e., the elements to which seat stays 20 and chain stays 22 are connected) or the adaptors (mounted on the tangs) of the present invention, are shaped in such a way (e.g. with an exterior or interior recess) that their respective tubular elements (the elements coupled thereto) may be deformed to correspond and interlock with (substantially form fit with) the shape of the joints and lugs and thereby form a strong joint without welding or joining with a third mechanical element. The tubular elements can be deformed by an electromagnetic joint forming process to form to the interengaging shape of the lug joint.

The lugs (or at least their joints), tangs, and adaptors of the present invention are preferably formed by casting or molding a material (preferably plastic) into the desired shape. Thus, these elements are easy to form and relatively inexpensive to manufacture. For the sake of brevity the following description with respect to the lugs is to be understood as applicable to the joints, tangs, and adaptors as well. The material used for the lugs of the present invention must have the stiffness and ultimate yield characteristics necessary to maintain the tubular elements in the frame (once the frame has been formed) and also must be sufficiently shock resistant so that the material is not shattered during joining of the lugs and the tubular elements. Preferably each lug is formed as a unitary piece that is injection molded, preferably from an injection moldable plastic. Such plastic may be a polyurethane injection moldable plastic or epoxy plastic which has at least about 40% by weight long (approximately 0.35 inch long) carbon fibers (preferably graphite fibers) such as made by the company Celestran. Any other material may be used, however, such as any other desired composite material, as long as the material has the above-described properties. Preferably, the material used is non-metallic and may be electrically non-conductive, or at least less so than the tubular elements in the frame.

Lugs 24, 26, and 28 of the present invention preferably have similarly-shaped joints and thus, for the sake of brevity, the description of the first-described lug is applicable to the other lugs. In particular, although head lug 24 is described in the greatest detail, this description is generally applicable to lugs 26 and 28 as well, along with other lugs formed in accordance with the principles of the present invention.

Figure 2:
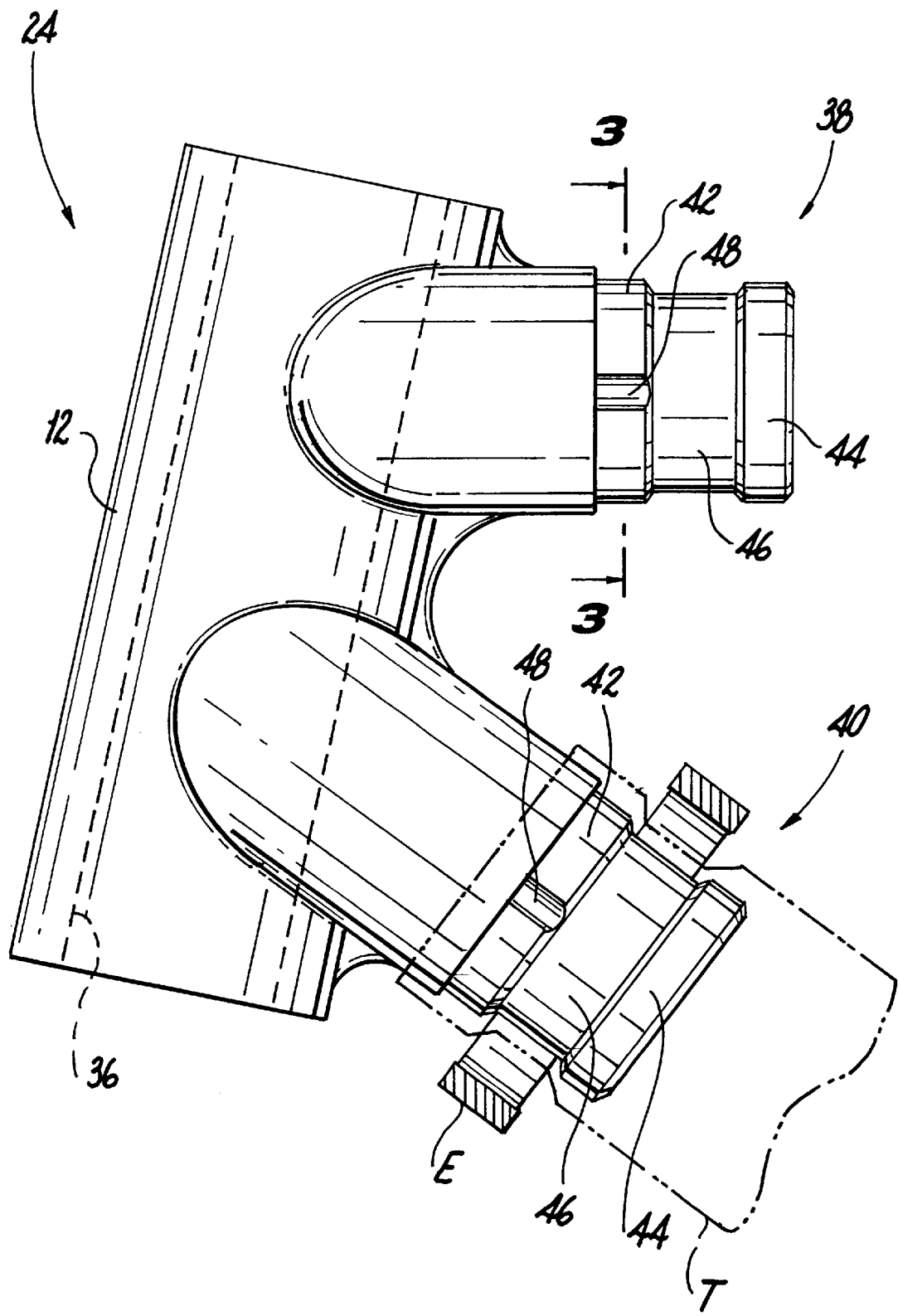
FIG. 2 is a side elevational view of a head lug of a bicycle formed in accordance with the principles of the present invention.

Head lug 24, formed in accordance with the principles of the present invention, is shown in FIG. 2. Head lug 24 has a short substantially vertical portion that forms head tube 12. Thus, head tube 12 of the present invention is not a separate piece of tubing as in the prior art, but, rather, is an integral piece of the head lug 24 and therefore is formed of the same light-weight material, such as plastic, from which head lug 24 is formed as described above. The stem for the front fork of the bicycle may be inserted through channel 36 within head tube 12 and handlebars may be coupled to the stem in any manner desired. Head lug 24 includes top tube joint 38 and down tube joint 40 along which top tube 14 and down tube 16 are respectively coupled to head tube 12 and head lug 24. The lug joints of the present invention, such as top tube joint 38 and down tube joint 40 of head lug 24, are formed such that the hollow ends of tubular elements of the frame of bicycle 10 may be extended over them. The joints are further shaped to have deformed areas (preferably externally radially inwardly) so that the tube ends that extend over the joints of the lugs may be deformed about the joints so as to be substantially form-fitted to conform to the exterior shape of the joints and to lock the tubular element with respect to the lug in either a longitudinal or rotational direction. In a preferred embodiment, each joint 38, 40 of head lug 24 (and the joints of the remaining lugs) preferably has a proximal ridge 42 and a distal ridge 44, with a circumferential groove 46 therebetween. Groove 46 extends transverse to the longitudinal axis of the joint in which groove 46 is found. A substantially hollow end of a tubular member may be inserted over a joint and deformed to conform to the exterior shape of the joint to fit within circumferential groove 46 of the joint and thereby prevent the tube from being pulled off the joint. A longitudinal anti-rotation notch 48 may be included on the joints of the lugs of the present invention to lock a tube mounted thereon against rotation with respect to the lug. Anti-rotation notch 48 may run into circumferential groove 46 at one end so that a shoulder is not needed to define the longitudinal extent of notch 48. A cross-sectional view along line 3—3 of exemplary joint 38 is shown in FIG. 3 to illustrate the shape of notch 48. As shown, joint 38 preferably includes at least one longitudinal anti-rotation notch 48 formed in the exterior of the joint and extending along the longitudinal axis of the joint. The corresponding tube (in this case top tube 14) is molded so that the tube is substantially form-fitted within anti-rotation notch 48 to prevent rotation of the tube with respect to its corresponding joint.

It will be understood that circumferential groove 46 need not extend completely around the circumference of the joints of the present invention. Further, although four anti-rotation notches 48 are shown in FIG. 3, it will be understood that any number of such notches, including no notches, may be used in the joints of the lugs of the present invention depending on the friction fit formed between the joined tubular element and lug. Additionally, although the lugs and joints are shown as having substantially circular cross-sections, the lugs and joints of the present invention may be formed with any desired cross-section, the cross-section of the tubes of the present invention preferably corresponding to the cross-sections of their respective joints (i.e., the joints to which they are coupled). Naturally if the cross section is square or some other polygonal shape or if the materials provide sufficient friction, there may be no need for anti-rotating notches.

Because, as discussed above, the tubular elements of frame 10 are joined to the joints of the lugs of the present invention by deforming the tubular elements to conform to the shape of the joints, the joints of seat tube lug 26 and crank lug 28 are preferably formed similarly to the joints of head lug 24, and for the sake of brevity, are not described in as much detail. Seat tube lug 26, shown in FIG. 4 from the side opposite that shown in FIG. 1, has at least a top tube joint 50 and seat stay joints 52 extending from a fork 54 that is positioned about rear wheel 34. Accordingly, seat stay joint 52 extends further away from the main body of seat tube lug 26 than does top tube joint 50. Joints 50 and 52 are similar to joints 38 and 40 of head lug 24 in that joints 50 and 52 may have their respective tubular elements (i.e., top tube 14 and seat stays 20) extended over them and the tubular elements deformed thereabout. Specifically, an end of top tube 14 may be extended over and substantially form fitted about top tube joint 50, and seat tube stays 20 may be extended over seat stay joints 52 and substantially form fitted thereabout, as described above with respect to top tube 14 and joint 38. Thus, as in exemplary joint 38, joints 50 and 52 preferably include a groove 46 and may further include at least one anti-rotation notch 48 to inhibit rotation between respective form-fitted elements.

Although seat tube joint 56 may be formed as a male joint similar to joint 38, seat tube joint 56 is preferably formed such that the upper end of seat tube 18 may be inserted within internal seat tube channel 58 of joint 56. Seat post joint 60 is preferably substantially aligned with seat tube joint 56 and includes an interior channel 62 preferably in communication with seat tube channel 58. A seat post may be inserted into channel 62 and joined to seat tube lug 26 in any desirable manner. Seat tube joint 56 preferably includes at least one opening 64 through which seat tube 18 is deformed to lock seat tube 18 relative to its respective joint 56. A deforming element may be inserted through seat post channel 62 and into the interior of seat tube 18 (within channel 58) to deform seat tube 18.

A cross-sectional view along line 5—5 of FIG. 4 of exemplary female joint 56 is shown in FIG. 5. As shown, female joint 56 preferably includes at least one deformation in the form of an opening 64 through which a tubular element inserted within interior channel 58 may be deformed to secure the tubular element to the female joint 56. Although shown as a complete through-hole, opening 64 may be formed as a partial opening from interior channel 58 extending toward the exterior of joint 56. Although three openings 64 are shown in FIG. 5, it should be understood that any number of such openings may be used in joint 56 and female joints similar to joint 56.

If desired, seat tube lug 26 may be provided with a cable guide 66 on seat stay fork 54. A brake cable from the front hand brake of the bicycle, running along top tube 14 to the rear hand brakes, may be passed through cable guide 66, as is known in the art.

Figure 6:
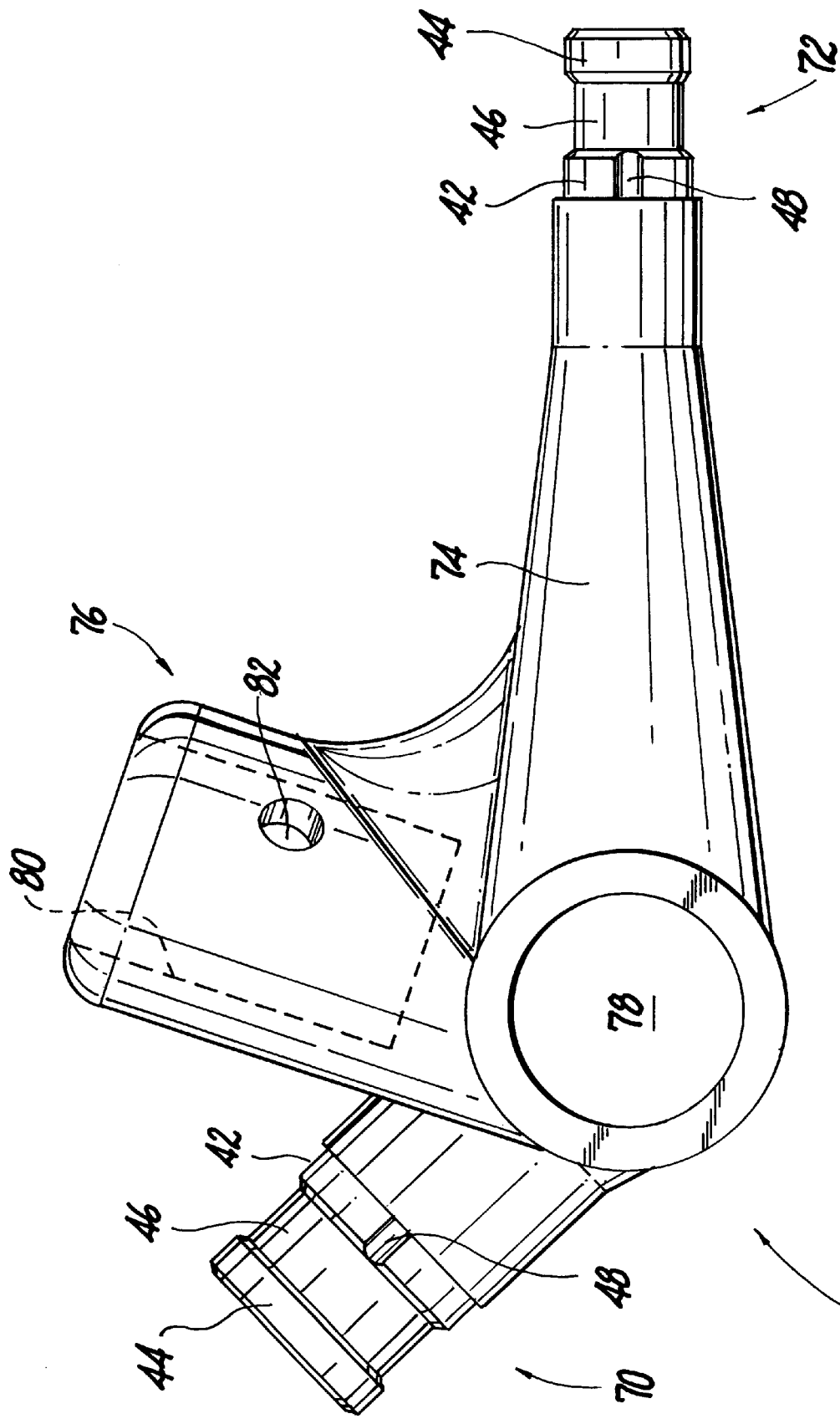
FIG. 6 is a side elevational view of a crank lug of a bicycle formed in accordance with the principles of the present invention.
Figure 7:
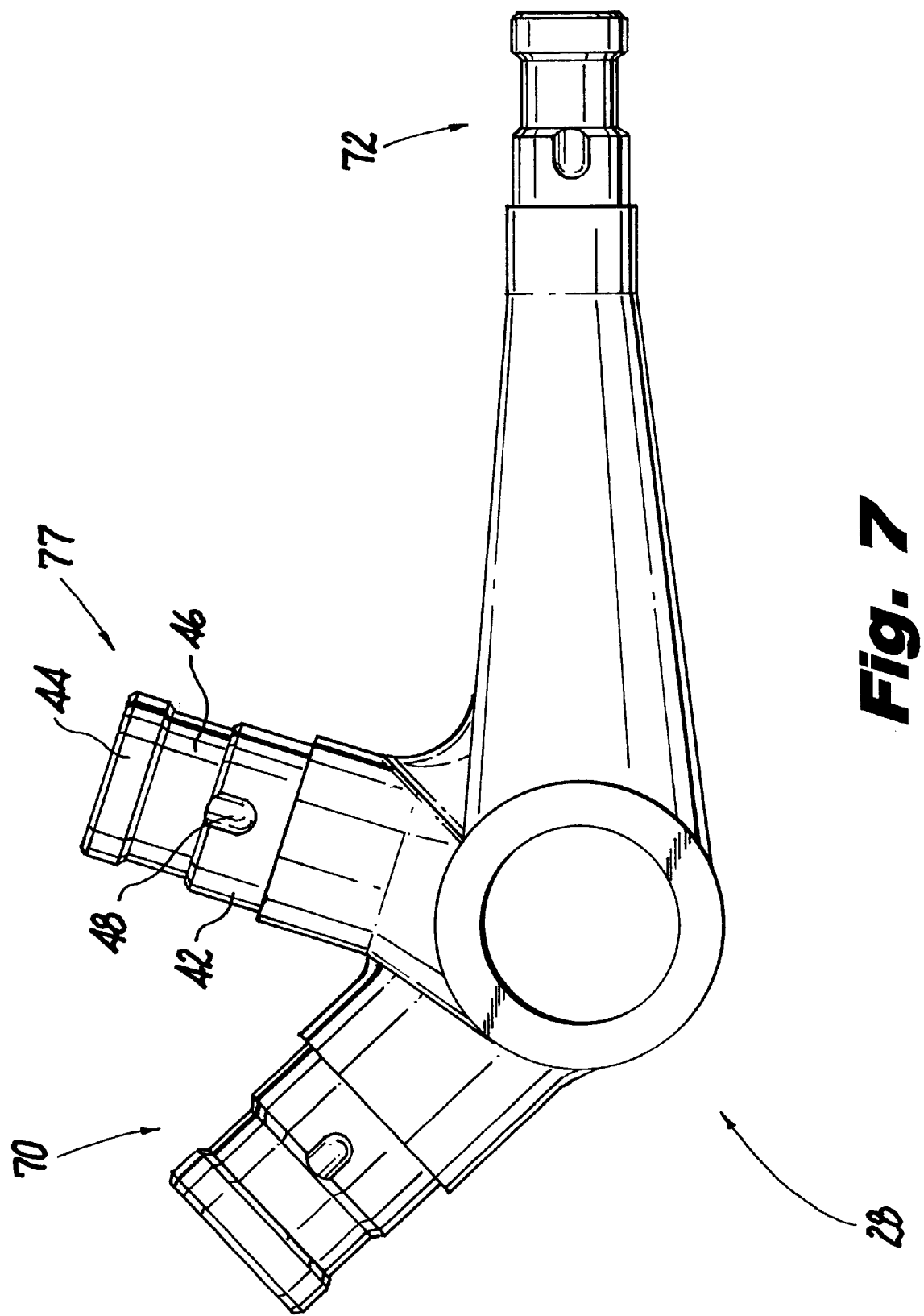
FIG. 7 is a side elevational view of a modified version of the crank lug of FIG. 6.

Crank lug 28, shown in FIG. 6 from the side opposite that shown in FIG. 1, has at least a down tube joint 70 and chain stay joints 72. As is common in the art, two chain stay joints 72 are provided on crank lug 28, extending along a fork 74 formed to fit about rear wheel 34 and to accommodate the chain ring of the bicycle (not shown). Joints 70 and 72 are formed in the same manner as joints 38, 40, 50, and 52 discussed above. Therefore, for the sake of brevity, the shape, which has been described with respect to exemplary joint 38, is not further discussed with respect to joints 70 and 72. The lower end of down tube 16 is extended over down tube joint 70 of crank lug 28 and is substantially form-fitted about joint 70. Likewise, chain stay joints 72 of crank lug 28 are shaped to fit within chain stays 22 so that the latter may be substantially form-fitted about their respective joints. Crank lug 28 further includes seat tube joint 76 and passage 78 through which the pedal crank of the bicycle (not shown) is passed. Seat tube joint 76 of crank lug 28 is shown as a female joint similar to female seat tube joint 56 of seat tube lug 26 (shown in FIG. 4). As discussed above, female seat tube joint 56 of seat tube lug 26 is an exemplary female joint. Accordingly, the above description of exemplary female joint 56 of FIGS. 4 and 5 is applicable to female joint 76 of FIG. 6. Seat tube joint 76 of crank lug 28 includes an internal channel 80 through which the lower end of seat tube 18 is inserted. An opening 82 is provided extending from internal seat tube channel 80 through which the lower end of seat tube 18 may be deformed to couple seat tube 18 and crank lug 28. Such deformation may be accomplished by inserting a deformation member (as discussed in further detail below) through the top of seat tube 18 and into the vicinity of opening 82. It will be understood that a male joint 77, shown in FIG. 7 may be used, instead, as the seat tube joint of crank lug 28. Seat tube joint 77 is formed similar to joints 70 and 72.

Figure 8:
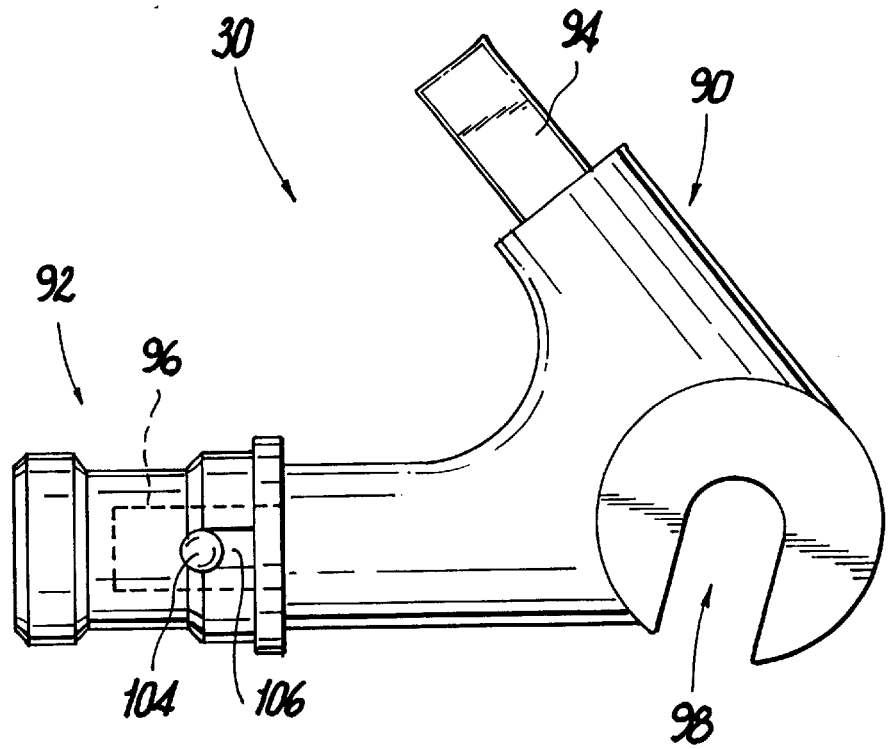
FIG. 8 is a side elevational view of a dropout assembly of a bicycle having an adaptor formed in accordance with the principles of the present invention.
Figure 9:
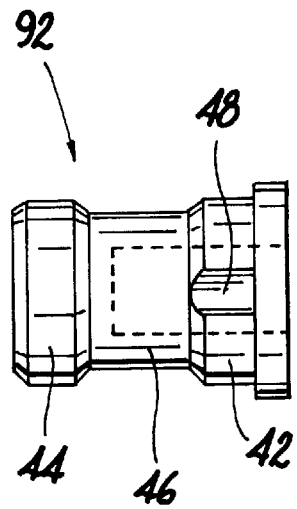
FIG. 9 is a side elevational view of the adaptor shown in FIG. 8.

Although the tangs of dropout assembly 30 (FIG. 8) may be shaped like the joints of lugs 24, 26, and 28 of the present invention, i.e., specifically shaped to be inserted into their corresponding tubular elements, the dropout assembly 30 of the present invention may utilize a standard dropout 90 on which an adaptor 92, formed in accordance with the principles of the invention, may be mounted. Dropout assembly 30, shown in FIG. 8, therefore includes a dropout 90 that may be any known dropout, formed from such materials as stainless steel, titanium, aluminum, or any other desirable sturdy material such as metal. Dropout 90 includes seat stay tang 94 and chain stay tang 96 to which a seat stay 20 and a chain stay 22 are respectively coupled. Dropout 90 further includes cut out 98 through which the axle (not shown) of rear wheel 34 is inserted. In accordance with the principles of the present invention, in order to have tangs 94 and 96 coupled to their respective tubular elements, without requiring welding or the use of a bonding agent, an adaptor 92 is positioned over each of tangs 94 and 96. Adaptor 92, shown in isolation in FIG. 9, is shaped to fit within its respective tubular element and includes deformed areas into which the respective tubular elements may be deformed to couple the joints and tubular elements. Preferably, adaptor 92 is shaped like the joints of lugs 24, 26, and 28. Specifically, adaptor 92 preferably includes ridges 42 and 44 with a circumferential groove 46 (substantially transverse to the longitudinal axis of adaptor 92) formed therebetween. Preferably, at least one of the ridges 42, 44 includes at least one longitudinal anti-rotation notch 48, such as described above with respect to exemplary joint 38.

Figure 10:
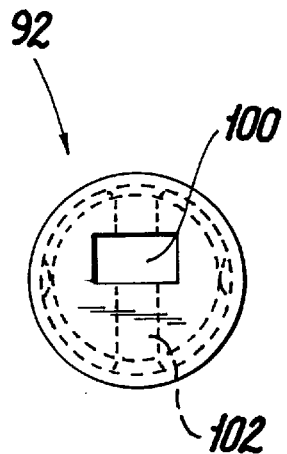
FIG. 10 is an end view of the adaptor of FIGS. 8 and 9.

An end view of adaptor 92 is shown in FIG. 10. Because tangs 94 and 96 are often rectangular in form, adaptor 92 preferably includes an internal channel 100 shaped (in this case as a rectangular channel) to accommodate one of tangs 94, 96. Adaptor 92 also preferably includes a transverse channel 102. A pin 104 (shown in FIG. 8) is commonly provided on tangs 94 and 96 to secure respective tubular elements thereto. Pin 104, which extends through its respective tang 94, 96, may be passed through internal transverse channel 102 of adaptor 92 and into a pin-locking opening 106 in respective tang 94, 96 to thereby lock adaptor 92 onto its respective tang 94, 96. Opening 106 may be a through holes or, instead, may be a partial opening sufficiently deep to securely lock pin 104, and respective tang 94, 96, with respect to adaptor 92. An end of a respective tubular element stay 20, 22 may be extended over adaptor 92 and deformed thereabout, such as described above, by the deformation method as will now be described. Chain stays 20, 22 maintain pin 104 in its locking position within channel 102 and opening 106. It will be understood that adaptor 92 may be used to adapt other lug joints for use with the electromagnetic forming principles of the present invention.

In accordance with the principles of the present invention, the tubular elements of frame 10 (tubes 14, 16, 18, 20, and 22) are deformed with respect to the joints of their respective lugs, such as by crushing, in any desirable fashion. Preferably, electromagnetic pulse forming is used to physically deform the tubular elements relative to their respective joints to substantially conform the ends of the tubular elements to the shape of the joint. Such joint forming is preferably accomplished as follows. A tubular element T is inserted about a respective joint and coil and/or field shaper, is positioned about the portion of the tube inserted over the joint, as shown in FIG. 2. A large current pulse is then applied to the coil and/or field shaper in order to create an electromagnetic field that crushes, i.e., plastically deforms, the material of the electrically conductive tubular element T onto a joint (in this case, exemplary joint 40) so it assumes the desired configuration, i.e., the electromagnetic force conforms the tubular element to the shape of the joint. For example, if the joint is shaped like joint 40, the tubular element extended over the joint is deformed to fit within the radially inwardly deformed areas such as circumferential groove 46 and notch 48.

Electromagnetic forming works because the wire coil used to create the required electromagnetic field creates a corresponding magnetic field around the coil when a high electrical current is applied through the coil. The coil's magnetic field in turn causes an electrical current on the surface of the tube, which current creates a corresponding magnetic field in the tube of opposite polarity to the magnetic field of the coil. Thus, the material of the tube is repelled from the coil and is crushed towards the joint. This technique is described in U.S. Pat. No. 5,188,177, which is incorporated herein by reference. The electromagnetic forming apparatus of the present invention may be formed as shown in FIG. 2 of U.S. Pat. No. 5,188,177, or in any other manner known in the art to accomplish the joint forming of the present invention.

Preferably the large current is created through the use of a capacitor bank that stores the necessary energy and takes at most six seconds to recharge. In accordance with this joint forming method, the joint forming process is completed in a matter of milliseconds. Thus, the manufacture of a frame having joints formed in accordance with the principles of the present invention is less expensive than welded frames because less skill is involved in such material joint forming and less time is required to form a successful and sturdy joint. Moreover, the quality of the joint may easily be inspected externally by examining the physical deformation of the tube. Because the above-described joint forming method and apparatus permit the establishment of joints between different materials, such as metallic or electrically conductive materials and non-metallic materials such as injection molded plastics, an exceptionally light-weight, inexpensive frame may be formed. Additionally, because the lugs of the present invention preferably are injection molded, the manufacturer is afforded much flexibility in choosing shapes and cross-sections of the tubing and lugs, such that non-traditional tubing and lugs may be used.

The above-described joint forming method and apparatus may be applied to various other frames that are used in mobile units and therefore are formed in as lightweight a manner as possible. For example, the joint forming method and apparatus of the present invention may be used in walkers or in wheelchairs, such as shown in FIGS. 11–14.

Modular wheelchairs that permit customization of the seat height, width, seat depth, back height, etc., are known in the art. Typically, the frame of a modular wheelchair is formed from a plurality of tubular elements coupled at various connecting joints. Thus, a wheelchair with the desired dimensions may be formed by selecting a tubular element having the desired dimensions for the specific section of the wheelchair. Typically, the tubular elements of the frame of the modular wheelchair are formed from a material such as metal, in particular, aluminum tubing. In accordance with the principles of the present invention, the aluminum tubing of modular wheelchairs may be joined together with the above-described method and apparatus. Specifically, lugs may be formed having joints with configurations similar to exemplary joints 38 or 56 of bicycle frame 10 described above. The lugs may either be formed from a lightweight material, preferably a non-metallic material such as injection moldable plastic, as lugs 24, 26, 28 of bicycle frame 10, or may be machined metallic fittings.

Figure 11:
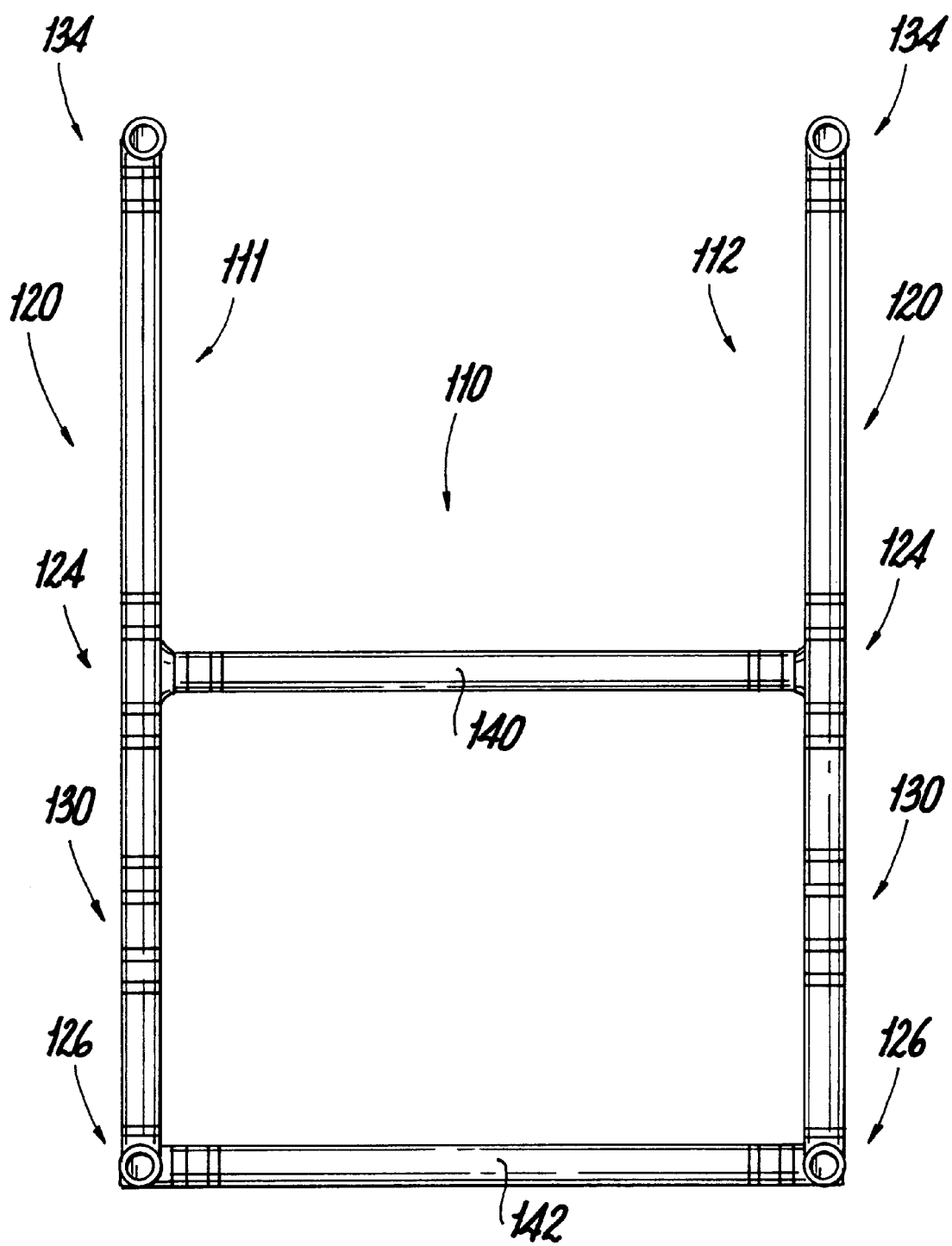
FIG. 11 is a rear elevational view of a modular wheelchair frame formed in accordance with the principles of the present invention.
Figure 12:
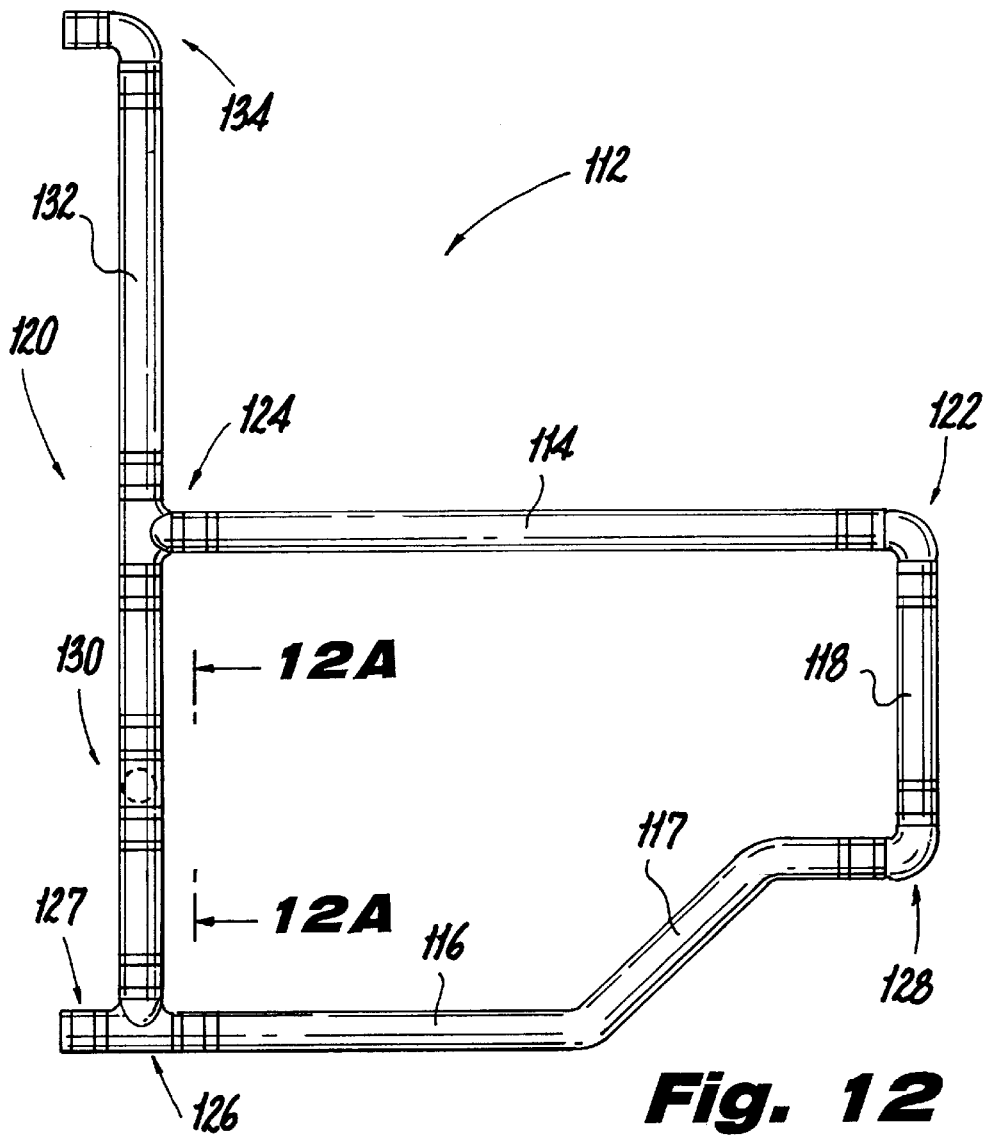
FIG. 12 is a side elevational view of a side frame of the modular wheelchair frame of FIG. 11.

Turning now to FIGS. 11 and 12, a modular wheelchair frame 110 (shown in rear elevation in FIG. 11) is typically formed from two side frames 111, 112 (shown in greater detail in FIG. 12) coupled together at a selected distance. Exemplary right side frame 112 includes an upper horizontal support 114, a lower horizontal support 116, a front vertical support 118, and a rear vertical support 120, each joined with respective lugs formed in accordance with the principles of the invention as discussed above. Thus, for the sake of brevity, the joints of each of the lugs of frames 111 and 112 are not individually labeled or described, each joint preferably being similar to exemplary joint 38 of FIG. 2 or 56 of FIG. 4, as described above. Accordingly, each joint preferably has a proximal ridge 42 and a distal ridge 44, with a circumferential groove 46 therebetween, and preferably at least one longitudinal anti-rotation notch 48, if necessary. Moreover, for the sake of brevity, the connection of the tubular elements of frames 111 and 112 to their respective lugs will not be discussed in detail, the connection being accomplished in accordance with the methods described above with respect to bicycle frame 10.

Figure 12A:
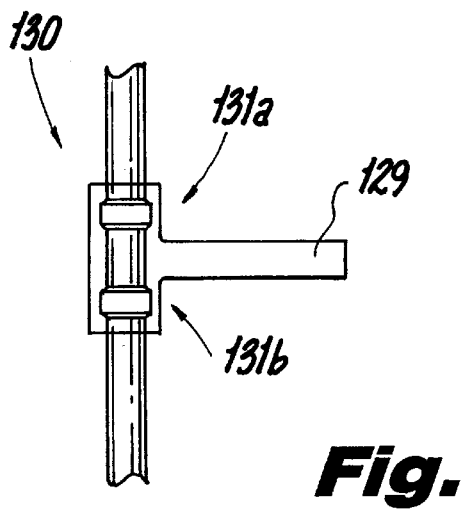
FIG. 12A is a view along lines 12A—12A of FIG. 12.

Upper horizontal support 114, from which the seat is suspended and on which an armrest may be supported, is coupled to front vertical support 118 via upper front elbow-shaped lug 122 having preferably two perpendicularly oriented joints. Thus, the front end of upper support tube 114 is placed over the horizontal joint of lug 122 and deformed to conform to the shape of its respective joint, and the upper end of front vertical support 118 is inserted over the vertically positioned joint of lug 122 and deformed to conform to the shape of its respective joint. The rear end of upper horizontal support 114 is coupled to rear vertical support 120 via a horizontally oriented joint of a lug such as a four joint connector node lug 124. Lug 124 may have four joints, at least three of which are perpendicular to each other. The vertical joints are fitted between portions of vertical support 120, and the other horizontally oriented joint is used for coupling left and right side frames 111 and 112, as discussed below. The rear end of lower support tube 116 is connected to rear vertical support 120 via a rear lower four joint connector node lug 126 shaped similar to lug 124. If desired, a foot bar may be joined to rear joint 127 of rear lower lug 126 to facilitate backward pivoting of the assembled modular wheelchair as known in the art. The front end of lower horizontal support 116 is joined to front vertical support 118 via lower front elbow-shaped lug 128. It is noted that lower horizontal support 116 includes a bend 117 to accommodate the front wheels (not shown) of the wheelchair. Foot supports and casters for the front wheels may be mounted on one of front vertical support 118 and lower horizontal support 116. An axle lug 130 is preferably provided between lugs 124 and 126 along rear vertical support 120. As shown in FIG. 12A, axle lug 130 preferably includes a horizontally oriented joint 129 and two oppositely positioned vertical joints 131a, 131b, the axle of the rear wheel of the wheelchair (not shown) being mounted on the horizontally oriented joint 129. Alternatively, as shown in FIG. 11, axle lug 130 may instead have an opening through which the axle of the rear wheel may be positioned and maintained. Rear vertical support 120 further includes upwardly extending handle support 132. An elbow shaped handle lug 134 may be fitted within and coupled to the upper end of handle support 132 so that handles (not shown) may be horizontally coupled to handle support 132. Alternatively, handle support 132 may be bent into the desired handle bar configuration. The seat back of the wheelchair is preferably mounted between the handle supports 132 of the two side frames 111, 112.

Left side frame 111 is formed substantially the same as right side frame 112. Left and right side frames 111 and 112 are joined, as shown in FIG. 11, to form wheelchair frame 110 via upper connection bar 140 (joined to lugs 124) and lower connections bar 142 (joined to lugs 126). The connection of the tubular frame elements of frame 110 may be performed in any desirable maimer, but preferably by deforming the ends of the tubular elements about their respective joints, and, most preferably, by electromagnetic pulse forming in accordance with the principles of the present invention.

Figure 13:
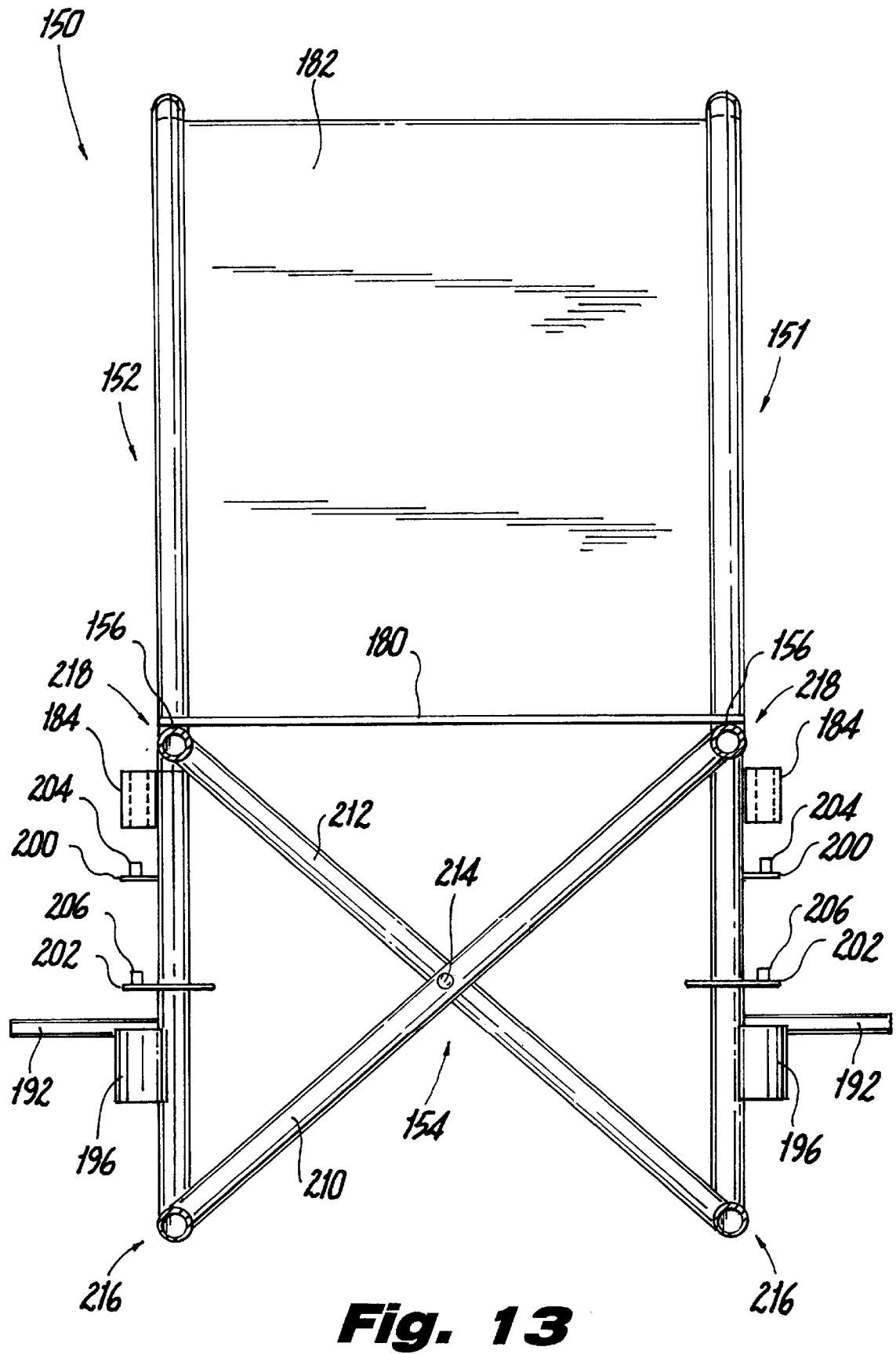
FIG. 13 is a front elevational view of a folding wheelchair frame formed in accordance with the principles of the present invention.
Figure 14:
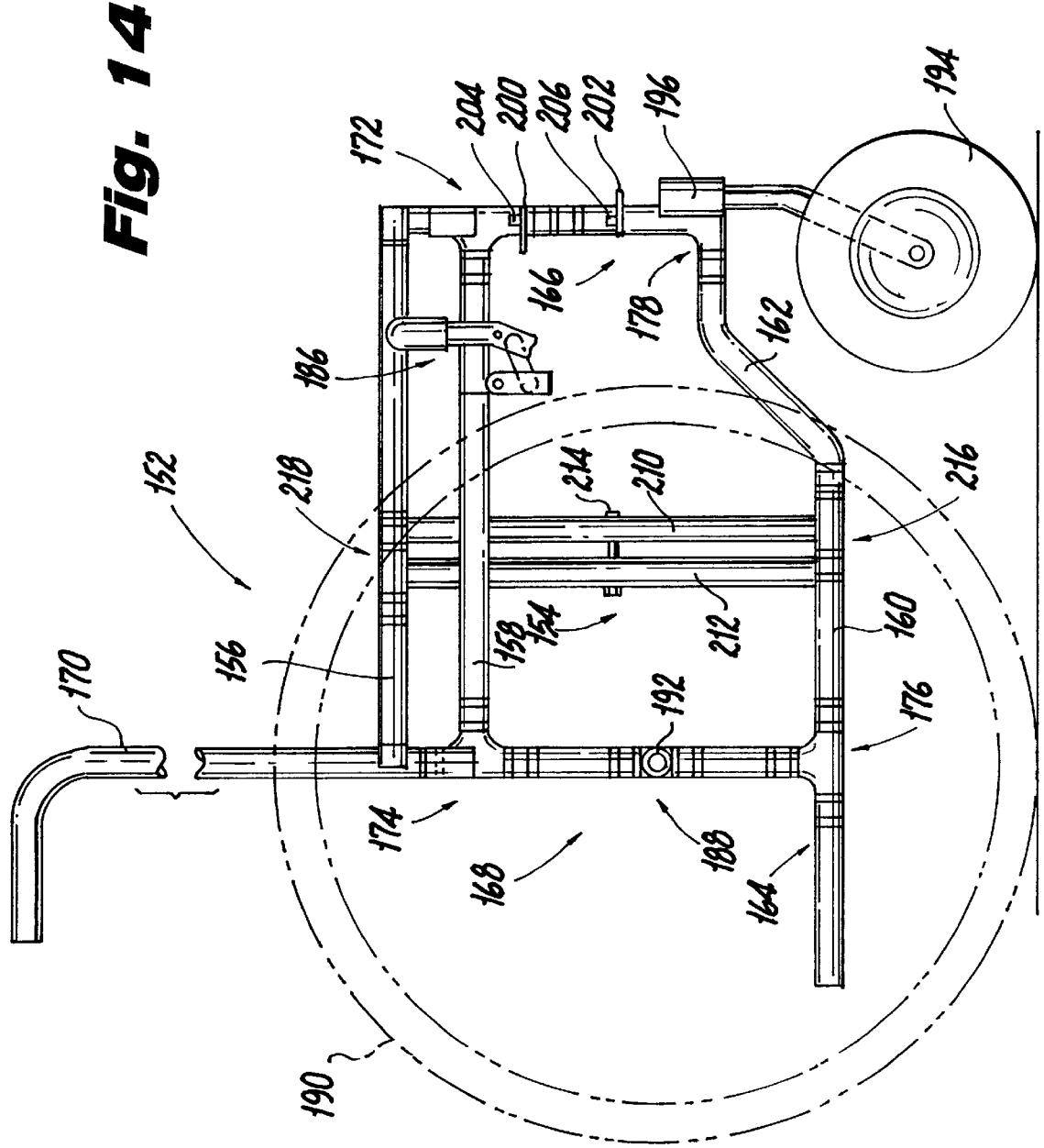
FIG. 14 is a side elevational view of the folding wheelchair frame of FIG. 13.

The principles applied in forming modular wheelchair 110 of FIGS. 11 and 12 may similarly be applied in forming a folding wheelchair frame 150 such as shown in FIGS. 13 and 14. As may be seen from the front elevational view of wheelchair frame 150 in FIG. 13, wheelchair frame 150 includes left side frame 151 and right side frame 152, coupled together by a cross-brace assembly 154. Exemplary right side frame 152, shown in greater detail in FIG. 14, includes seat support 156, upper horizontal support 158, lower horizontal support 160, lower side bent frame rail 162 (bent to accommodate the front wheel 194 of the wheelchair), footbar 164, front vertical support 166, rear vertical support 168, and handle 170 (which is either bent as shown, to form a handle, or may include a lug such as shown in FIG. 12, to which a handle may be coupled), each coupled via respective lugs 172, 174, 176, 178 to form folding wheelchair frame 150. It will be understood that the joints of lugs 172, 174, 176, and 178 each preferably have joints formed to have a shape similar to exemplary joint 38 of lug 24 of FIG. 2 or joint 56 of FIG. 4. In particular, seat support 156, upper horizontal support 158, and front vertical support 166 are preferably coupled via a front T-shaped lug 172 having two oppositely positioned, substantially aligned joints and a third joint perpendicular to the first two joints. The rear end of upper horizontal support 158 is joined to rear vertical support 168 via rear T-shaped lug 174 to which handle support 170 is also coupled. The lower end of rear vertical support 168 is coupled to lower horizontal support 160 and footbar 164 via lower T-shaped lug 176. Lower horizontal support 160 may either be coupled to lower side bent frame rail 162 via a lug or any other desired joint or may be formed integrally therewith. The front end of lower side bent frame rail 162 is coupled to front vertical support 166 via lug 178.

The seat 180 of the wheelchair preferably is supported by seat support 156 of side frames 151 and 152 (as shown in FIG. 13). Seat back 182 preferably is mounted between handle supports 170 of left and right side frames 151, 152 (as shown in FIG. 13). An arm rest (not shown) may be mounted on each of side frames 151, 152 via tube mount 184 (shown only in FIG. 13) coupled to or formed integrally with front T-shaped lug 172. An optional brake 186 (shown only in FIG. 14) is preferably mounted on upper horizontal support 158. A wheel mounting fitting or axle lug 188 is preferably provided along rear vertical support 168. The rear wheel 190 of the wheelchair may be mounted on axle 192 coupled to wheel mounting fitting 188. Alternatively, an axle lug similar to lug 130 of FIG. 12A may be used. Front castors 194 may be mounted on the wheelchair via castor mounts 196 that are preferably coupled to lugs 178. Preferably, castor mounts 196 are tubular and a caster rod 198 is inserted and secured therein. Pivot plate connections 200 and 202 having pins 204, 206, respectively, may be provided on which optional foot rests (not shown) may be coupled for pivotal movement about a substantially vertical axis, as known in the art.

Left and right side frames 151, 152 are coupled together, as discussed above, via cross-brace assembly 154. Cross-brace assembly 154 includes front brace support 210 and rear brace support 212 pivotally connected via pivot pin 214. The lower end of front brace support 210 is rotatably mounted via lower cross-brace assembly joint 216 to the lower horizontal support bar 160 of one of side frames 151, 152 (as shown in FIG. 14, right side frame 152), while the lower end of rear brace support 212 is similarly rotatably coupled to a lower horizontal support 160 of the other of side frames 151, 152 (in this case, left side frame 151). Likewise, the upper end of rear brace support 212 is rotatably coupled via upper cross-brace assembly joint 218 to the upper horizontal support 156 of the side frame (in this case, right side frame 152) opposite the side frame to which the lower end of rear brace support 212 is connected. Similarly, the upper end of front brace support 210 is rotatably connected to the upper horizontal support 156 of the side frame (in this case, left side frame 151) opposite the side frame to which the lower end of front brace support 210 is rotatably connected. Folding wheelchair frame 150 is collapsed by pivoting brace supports 210 and 212 about pivot 214 to bring left side frame 151 and right side frame 152 together. Seat 180 and back 182 are preferably formed from flexible material that folds upon bringing the side frames together.

Thus, in accordance with the principles of the present invention, either a modular wheelchair or a folding wheelchair may be formed using standard tubing, with lugs that are lighter than those of the prior art coupling the tubular elements. The connection of the tubular elements may be accomplished without welding or adhesive bonding. The resulting wheelchair is thus lighter and easier to maneuver than those of the prior art.

The joint forming method of the present invention may be used in further improving the frame of a mobile unit, such as a bicycle, in a variety of other manners. Because the joint forming process of the present invention preferably deforms the material of the tubular elements of frames, any portion of the frame of a mobile unit that would require deformation of the frame elements may be deformed in accordance with the principles of the present invention as described above. One particular use for the forming processes of the present invention, preferably utilizing electromagnetic pulse forming techniques, involves deforming portions of the frame to modify the stiffness of the ride provided by the frame by modifying the axial spring constant of the tubular elements of the frame. The ride compliance features formed in accordance with the principles of the present invention allow the frame to be tailored to specific rider tastes and weights.

Figure 15:
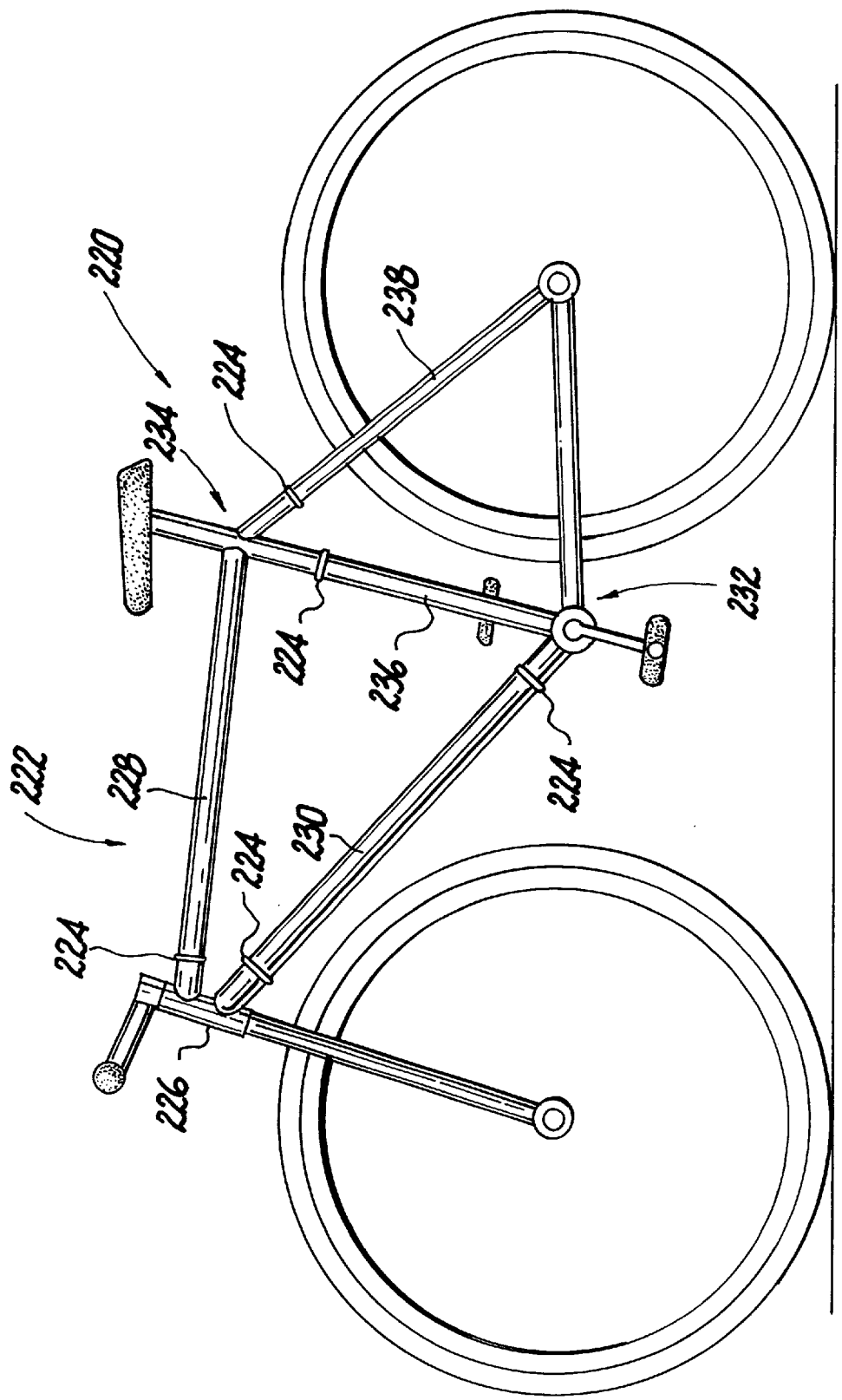
FIG. 15 is a side elevational view of a bicycle having ride compliance features formed in accordance with the principles of the present invention.

A bicycle 220 having a frame 222 (which may be formed in accordance with the above-described lugs and the above-described joint-forming technique) with ride compliance features 224 formed in accordance with the principles of the present invention is shown in FIG. 15. Ride compliance features 224 are shown in FIG. 15 formed adjacent head tube 226, along top tube 228 and down tube 230, adjacent crank lug 232 along the lower portion of down tube 230, and adjacent seat tube lug 234, along seat tube 236 and along one or both of seat stays 238. It will be understood that these are not the exclusive locations at which ride compliance features 224 may be placed. One of ordinary skill in the art can determine the optimal number and placement of ride compliance features 224 to provide in bicycle frame 222 to achieve the desired modification of the frame stiffness.

Ride compliance features 224 are preferably formed by deforming the tubular elements of bicycle frame 222 to add compliance, thereby allowing the tailoring of the ride characteristics of the bicycle to individual riders. Preferably, ride compliance features 224 are formed as circumferential distortion features that reduce the axial spring constant of the tubular member of frame 222 to which the feature 224 is applied. It will be appreciated that the tubular members need not be circular in cross section, nor do the individual compliance features 224 necessarily extend around the entire circumference of the tube.

Figure 16:
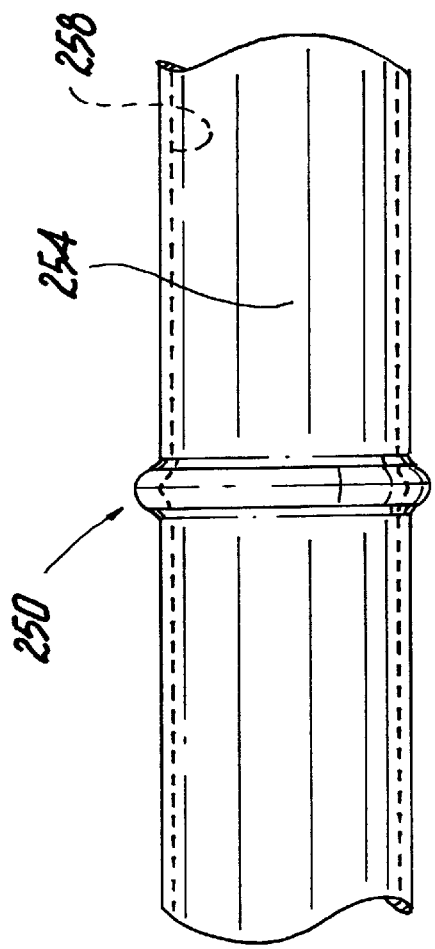
FIG. 16 is an isolated elevational view of a ride compliance feature that may be used in the frame of FIG. 15.
Figure 17:
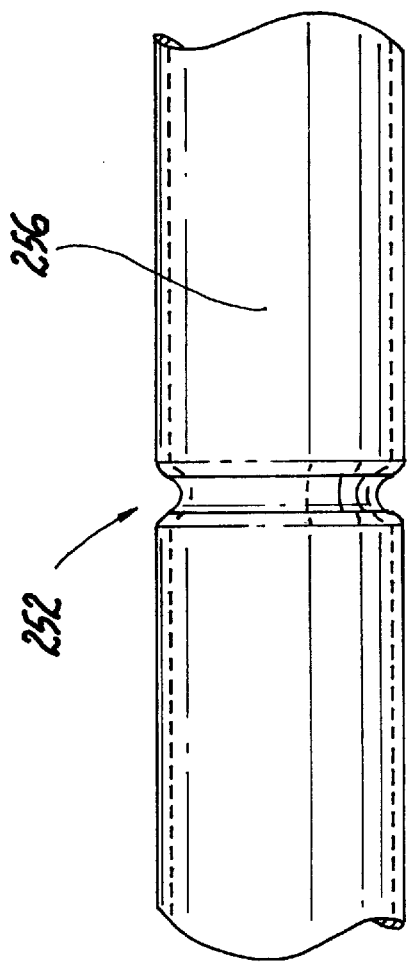
FIG. 17 is an isolated elevational view of a ride compliance feature that may be used in the bicycle frame of FIG. 15.

Exemplary compliance features 250 and 252 are shown in FIGS. 16 and 17, respectively. Male ride compliance feature 250 is an outwardly extending, preferably circumferential, distortion or convolution in exemplary tubular element 254. Male ride compliance feature 250 is preferably formed by inserting the deformation tool (preferably formed as a wire coil that can fit within tubular element 254 in a shape necessary to create the desired deformation, as discussed above) within interior channel 258 to radially outwardly expand tubular element 254. In accordance with the principles of the present invention, this distortion may be created by inserting a coil (or other circular element) within tubular element 254 and generating an electromagnetic pulse that causes the desired deformation in the manner as discussed above. Tubular element 254 may be placed in a female die to permit a specifically shaped deformation to be formed. Female ride compliance feature 252 is an inwardly extending, preferably circumferential, distortion or groove in exemplary tubular element 256. Female ride compliance feature 252 is preferably formed by positioning a coil around tubular element 256 (the coil being formed to substantially conform to the exterior shape of tubular element 256). An electromagnetic pulse is created to deform tubular element 256 inwardly to thereby form female ride compliance feature 252. A mandrel or die may be placed within tubular element 256 to permit a specifically shaped groove to be formed.

From the foregoing description, it will be clear that the present invention may be embodied in other specific forms, structures, arrangements, proportion, and with other elements, materials, and components, without departing from the spirit or essential characteristics thereof. One skilled in the art will appreciate many modifications of structure, arrangement, proportions, materials, components, and otherwise, which are particularly adapted to specific environments and operative requirements, may be used in the practice of the invention, without departing from the principles of the present invention. For example, the tubular elements used in the present invention may have any desired cross-section. Additionally, the joints may be deformed to correspond to the shape of the ends of corresponding tubular elements. The presently-disclosed embodiments are therefore to be considered in all respects as illustrative and not restrictive, the scope of the invention being indicated by the appended claims, and not limited to the foregoing description.

What is claimed is:

1. A method of forming a frame for a mobile unit, the frame comprising a plurality of tubular elements, said method comprising the steps of:

providing a plurality of electrically conductive tubular elements, each of said tubular elements having a pair of ends;

providing a plurality of non-metallic connection elements for joining said tubular elements, each of said connection elements having at least one end defining a recessed area shaped to engage a respective end of a respective tubular element upon deforming said tubular element, to form a joint which resists tension between said tubular element and said connection element;

inserting said recessed areas of said connection elements, respectively, into respective ends of said tubular elements; and deforming said respective tubular elements over said recessed areas of said respective connection elements to conform to said recessed areas to thereby form a sturdy mechanical joint therebetween which resists tension between said tubular elements and said connection elements.

2. A method as in claim 1, wherein said steps of providing include the steps of providing a metallic tubular element and a plastic connection element, whereby said step of deforming conforms said tubular metallic element to to the shape of said plastic connection element.

3. A method of as in claim 2, wherein said step of deforming includes electromagnetic pulse forming said metallic tubular element.

4. A method of forming a joint between elements of different materials to assemble tubular elements of a frame, said method comprising the steps of:

selecting a tubular element formed from a first material;

selecting a connection element formed from a second non-metallic material lighter than and different than said first material;

shaping said connection element to have a recessed area at an end of said connection element upon deforming said tubular element which engages a respective end of said tubular element, to form a joint which resists tension between said tubular element and said connection element;

inserting said recessed area of said connection element into an end of said tubular element; and deforming said tubular element to conform to the shape of said recessed area defined in said connection element to thereby form a joint between said connection element and said tubular element in a manner which resists tension between said tubular element and said connection element.

5. A method as in claim 4, wherein said tubular element is formed from an electrically conductive material and is deformed by electromagnetic pulse forming.

6. A method as in claim 4, wherein said tubular element is formed from a metallic material and said connection element is formed from plastic.

7. A method as in claim 6, further comprising the step of injection molding said connection element from an injection moldable plastic with at least one recessed area and wherein the step of deforming said tubular element is performed by electromagnetic pulse forming to conform said tubular element to the shape of said recessed area.

8. A method as in claim 4, wherein said tubular element is formed from a metallic material and said connection element is formed from a composite material.

9. A method as in claim 8, further including the step of shaping said connection element to have at least one recessed area and wherein the step of deforming said tubular element is performed by electromagnetic pulse forming to conform said tubular element to the shape of said recessed area.

10. A method of forming a bicycle comprising a plurality of tubular elements and a plurality of connection elements joining adjacent tubular elements, said method comprising the steps of:

providing at least one electrically conductive tubular element having a hollow end;

providing at least one connection element having a relatively lower electrical conductivity than said conductive tubular element, said connection element shaped to fit within said hollow end of said tubular element, and including at least one radially inwardly directed recess shaped to engage a portion of a respective tubular element upon deforming said tubular element, to form a joint which resists tension between said tubular element and said connection element;

inserting said recessed areas of said at least one connection element, into said hollow end of said at least one tubular element; and deforming said hollow end without physical contact in order to conform to the shape of said recess in order to lock said at least one tubular element against movement with respect to said at least one connection element.

11. A method as in claim 10, wherein said connection element has a longitudinal axis, said method further comprising the step of, prior to deforming, forming a recess in the connection element in a non-parallel relationship with respect to the longitudinal axis of said connection element to prevent said at least one tubular element from being disconnected from said connection element.

12. A method as in claim 10, wherein said connection element has a longitudinal axis, said method further comprising the step of, prior to deforming, forming a recess in the connection element extending in a non-perpendicular relationship with respect to said longitudinal axis of said connection element to prevent rotation between said at least one connection element and said at least one tubular element.

13. A method as in claim 10, wherein said step of deforming further includes the step of electromagnetic pulse forming said hollow end.

14. A method of forming a frame for a mobile unit, the frame comprising a plurality of tubular elements, said method comprising the steps of:

providing a plurality of electrically conductive tubular elements, each of said tubular elements having a pair of ends;

providing a plurality of non-metallic connection elements for joining said tubular elements, each of said connection elements having at least one end being shaped with a circumferential recessed area and an axial recessed area;

inserting said recessed areas of said connection elements, respectively, into respective ends of said tubular elements; and deforming said respective tubular elements over said recessed areas of said respective connection elements to conform to said recessed areas to thereby form a sturdy mechanical joint therebetween in a manner which resists tension between said tubular elements and said connection elements.

15. A method of forming a bicycle comprising a plurality of tubular elements and a plurality of connection elements joining adjacent tubular elements, said method comprising the steps of:

providing at least one electrically conductive tubular element having a hollow end;

providing at least one connection element shaped to fit within said hollow end of said tubular element, said connection element including at least one circumferential recess and at least one axial recess;

inserting said recessed areas of said at least one connection element, into said hollow end of said at least one tubular element; and deforming said hollow end without physical contact in order to conform to the shape of said at least one circumferential recess and said axial recess in order to lock said at least one tubular element against axial and rotational movement with respect to said at least one connection element.

* * * * *